United States Patent [19]

Seidel et al.

[11] Patent Number: 4,901,565
[45] Date of Patent: Feb. 20, 1990

[54] STRAPDOWN MEASURING UNIT FOR ANGULAR VELOCITIES

[75] Inventors: Helmut Seidel, Starnberg; Fritz Hofmann, Munich, both of Fed. Rep. of Germany

[73] Assignee: Messerschmitt-Bölkow-Blohm GmbH, Munich, Fed. Rep. of Germany

[21] Appl. No.: 231,496

[22] Filed: Aug. 12, 1988

[30] Foreign Application Priority Data

Aug. 13, 1987 [DE] Fed. Rep. of Germany ....... 3726958

[51] Int. Cl.4 .............................................. G01C 21/00
[52] U.S. Cl. .................................................. 73/178 R
[58] Field of Search ............. 73/178 R, 178 T, 178 H; 244/175; 364/443, 444

[56] References Cited

U.S. PATENT DOCUMENTS

| 4,318,300 | 3/1982 | Maughmer | 73/178 R |
| 4,444,053 | 4/1984 | Rider | 73/178 R |

*Primary Examiner*—Donald O. Woodiel
*Attorney, Agent, or Firm*—Kenyon & Kenyon

[57] ABSTRACT

A strapdown measuring unit for measuring the angular velocities about the three axes of a flying body rotating relatively fast about its first axis is disclosed. The unit combines a Sagnac effect sensor for roll rate determination and two micro-mechanical acceleration sensors whose output, combined mathematically with the output of the Sagnac effect sensor, determines the angular velocity of the remaining two axes. The mathematical calculations are performed by a dedicated microprocessor which is integrated with the three sensors into a single small unit.

3 Claims, 2 Drawing Sheets

STRAPDOWN MEASURING UNIT FOR ANGULAR VELOCITIES

This invention relates to the field of instruments for measuring angular velocity. More particularly, it relates to those instruments known as "strapdown rate reference" which measure the angular velocities of a flying body rotating rapidly about a main axis.

BACKGROUND OF THE INVENTION

So-called "strapdown references" do not require the complicated servo mechanics of gimballed references suspended in a frame that previous devices required. See DE-OS No. 32 33 029. However, as the sensors required by a three axes strapdown reference instrument (roll axis, 1st and 2nd transverse axis) are costly and complex, such instruments are too expensive for general use.

In particular, as the roll axis measurement requires a relatively high measurement range and high scaling fidelity, a sensor which uses the Sagnac effect is preferred to other sensor types, particularly if great precision is required. Such Sagnac effect sensors can be formed using a ring laser sensor, an optic fiber sensor, or a micro-optic resonator laser sensor. Unfortunately, for a complete three-axis reference such sensors are also too expensive and complex for general use. Therefore, in light of the present state of the art, there exists a need for a sufficiently accurate and simple angular velocity sensor for the application in strapdown references.

SUMMARY OF THE INVENTION

It is an object of the present invention to provide a three-axis strapdown rate reference which is sufficiently accurate to be useful and also inexpensive enough to achieve widespread use.

A further object of this invention is to provide a three-axis rate sensor which can be at least partially manufactured using known integrated circuit fabrication techniques to reduce manufacturing costs.

To achieve the aforementioned objects, the present invention comprises a Sagnac effect sensor for measuring the roll rate and two angular acceleration sensors for measuring the angular acceleration about the non-rolling transverse axis. The sensors are coupled to a microcomputer which derives the roll rates of all three axes using known mathematical principles. As the angular acceleration sensors and microcomputer can be fabricated using known integrated circuit fabrication techniques, the cost of manufacturing can be reduced as well as the size of the completed unit.

Other and further objects of this invention will become obvious upon an understanding of the illustrative embodiments about to be described with reference to the figures or will be indicated in the appended claims, and further advantages not referred to herein will occur to one skilled in the art upon employment of the invention in practice.

DETAILED DESCRIPTION OF THE INVENTION

Referring to the figures, for one or both transverse axes 11 (the yaw axis) and 12 (the pitch axis), an angular acceleration sensor 13 is used to measure the angular acceleration about these axes. Such angular acceleration sensors are known in the art and are easier to manufacture than the so-called "rate sensors" previously used.

Both axes 11 and 12 are perpendicular to roll axis 10A. Using a computer or dedicated microcomputer the angular velocity about non-rolling reference axes 11 and 12 can be calculated from the angular accelerations about transverse axes 11' and 12'. These calculations utilize the following mathematical formulae:

$$\omega_{11} = -\frac{1}{\omega} \times \sin(\omega t) \times \dot{\omega}_{11'} + \frac{1}{\omega} \cos(\omega t) * \dot{\omega}_{12'};$$

$$\omega_{12} = \frac{1}{\omega} \times \cos(\omega t) \times \dot{\omega}_{11'} + \frac{1}{\omega} \sin(\omega t) * \dot{\omega}_{12'};$$

where
 $\omega_{11}$=angular velocity about axis 11
 $\omega_{12}$=angular velocity about axis 12
 $\omega$=roll rate
 t=time
 ($\omega t$)=roll angle
 $\dot{\omega}_{11'}$=angular acceleration about axis 11'
 $\dot{\omega}_{12'}$=angular acceleration about axis 12'

Figure 2A:
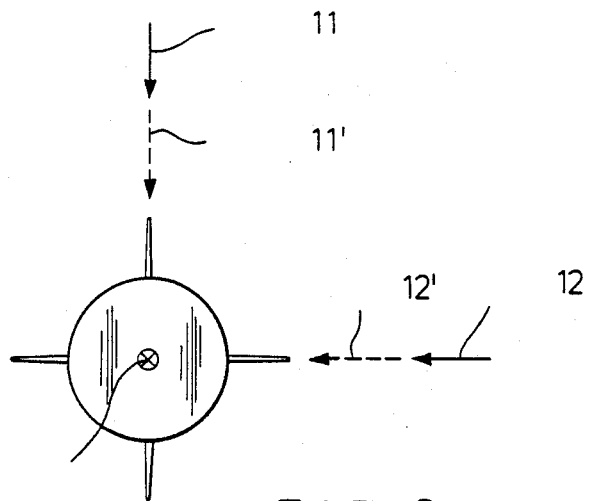
FIG. 2 is a different perspective view of the flying body with its axes indicated.
Figure 2B:
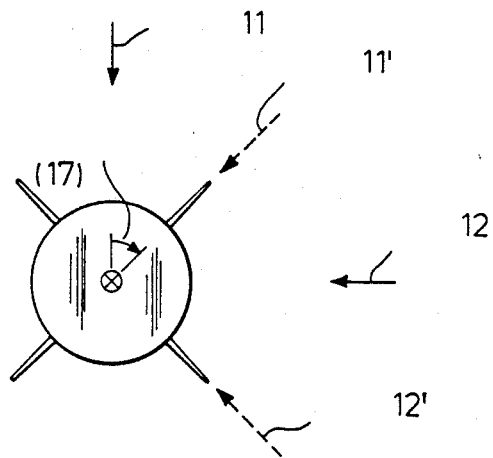

The measurement of the roll angle is indicated in FIG. 2 by reference numeral 17.

A variable roll velocity (variable roll rate) does not disturb the accuracy of this unit, provided that the calculations are performed relatively often. However, extremely slow roll rates will affect this unit adversely, due to the factor (1/roll rate) in both calculations. At medium to high roll rates the entire equations are calculated. At very high roll rates the second part of both equations, after the "+" sign, can be omitted without undue loss of accuracy. In this case, sensor 13A can also be eliminated.

A major factor contributing to the reduction of the manufacturing costs associated with this unit is that micro-mechanical angular acceleration sensors 13 and 13A are used as angular acceleration meters. These sensors are made using know integrated circuit techniques for forming micro-mechanical silicon sensors for translation axis accelerations. The chip, mask, and etching technology used to fabricate these sensors results in their costing very little per unit. Also, in the present invention, the useful frequency range of the sensors, where $f_{sensors}$=roll frequency±the angular velocity derived from the sensors, is limited to such an extent that the quasistationary zero point errors present in sensors 13 and 13A have no serious consequences.

Figure 1:
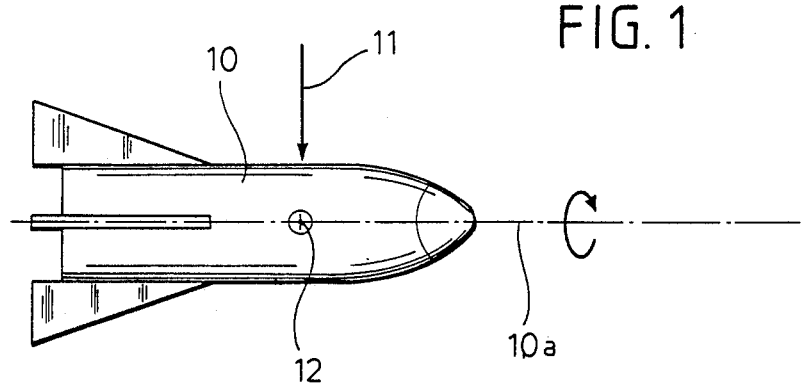
FIG. 1 shows a perspective view of a flying body with its roll, pitch and yaw axes indicated.
Figure 3:
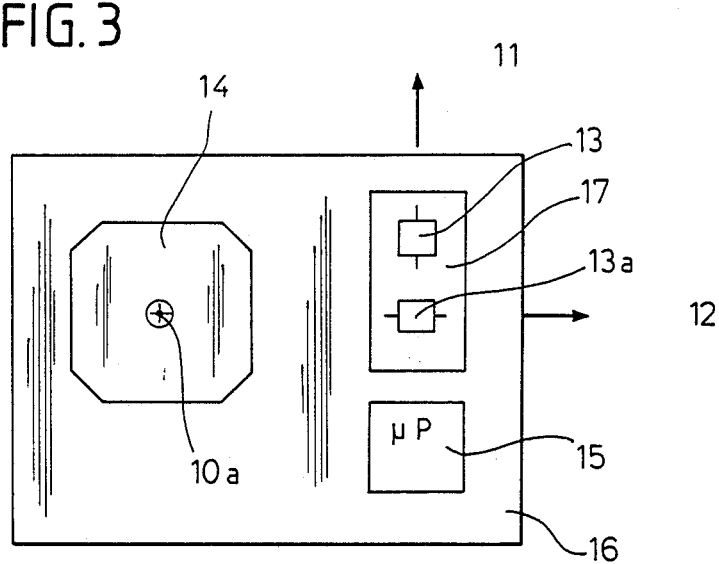
FIG. 3 is a block diagram of the unit according to the present invention.

Further cost reduction is achieved by the proposed integration of a Sagnac effect sensor 14 for roll rate determination and micro-mechanical angular acceleration sensors 13 and 13A in a single plane as shown in FIG. 3. Sensors 13 and 13A are included on micro-mechanical two-axes chip 17, and chip 17, sensor 14, and microcomputer 15 are then integrated into a single unit on electronic circuit board 16. Thus, the entire three-axis reference system 15 is accommodated on a single circuit card and the finished unit occupies a minimum of space.

As many apparently widely different embodiments of this invention may be made without departing from the spirit and scope thereof, it is to be understood that the invention is not limited to the specific embodiments thereof except as defined in the appended claims.

What is claimed is:

1. A strapdown measuring unit for a flying body having three-axes and rotating rapidly about its first axis, the unit measuring the angular velocity of the body about at least two of the three-axes, the unit being comprised of:

a roll sensor means for determining the roll velocity about the first axis;

angular acceleration sensor means for either the second or third axes or both for determining the angular acceleration of those axes; and microcomputer means coupled to the roll sensor means and the angular acceleration sensor means for determining the angular velocity of the second and/or third axes using the signal generated by the roll sensor means and the angular acceleration sensor means, said roll sensor means comprising a sensor which operates according to the Sagnac effect, said roll sensor being a planar object disposed lying flat on a planar substrate, the normal to the substrate extending along the first axis, the angular acceleration sensor means and said microcomputer means also being disposed lying flat on said planar substrate.

2. The measuring unit of claim 1 wherein the angular acceleration means are micro-mechanical angular accelerations sensors arranged on a two-axis integrated circuit chip means and the chip means is coupled to the microcomputer means.

3. The measuring unit of claim 2 wherein the chip means, the roll sensor means, and the microcomputer means are all arranged on a single electronic circuit board.

* * * * *